United States Patent
Hatakeyama

(10) Patent No.: US 7,441,619 B2
(45) Date of Patent: Oct. 28, 2008

(54) FUEL TANK PROVIDED WITH AIR GUIDE STRUCTURE OF STRADDLE-TYPE VEHICLE

(75) Inventor: Yutaka Hatakeyama, Hamamatsu (JP)

(73) Assignee: Suzuki Kabushiki Kaisha, Hamamatsu-shi (JP)

( * ) Notice: Subject to any disclaimer, the term of this patent is extended or adjusted under 35 U.S.C. 154(b) by 894 days.

(21) Appl. No.: 10/654,019

(22) Filed: Sep. 4, 2003

(65) Prior Publication Data
US 2004/0040958 A1 Mar. 4, 2004

(30) Foreign Application Priority Data
Sep. 4, 2002 (JP) ............................. 2002-259207

(51) Int. Cl.
*B60K 13/06* (2006.01)
*B60K 13/02* (2006.01)
(52) U.S. Cl. ..................... 180/68.3; 180/68.1
(58) Field of Classification Search ................ 180/229, 180/291, 68.1, 68.2, 68.3; 280/833, 834, 280/835; 220/4.14
See application file for complete search history.

(56) References Cited
U.S. PATENT DOCUMENTS

| | | | | |
|---|---|---|---|---|
| 4,323,135 A | * | 4/1982 | Tominaga et al. | 180/228 |
| 4,484,651 A | * | 11/1984 | Hattori et al. | 180/225 |
| 4,648,474 A | * | 3/1987 | Shinozaki et al. | 180/219 |
| 4,821,685 A | * | 4/1989 | Matsushima et al. | 123/184.47 |
| 5,145,023 A | * | 9/1992 | Tsurumi et al. | 180/68.1 |
| 5,620,217 A | * | 4/1997 | Ichikawa et al. | 293/102 |
| RE35,675 E | * | 12/1997 | Kitada | 180/68.1 |
| 5,692,578 A | * | 12/1997 | Miyakawa et al. | 180/68.3 |
| 6,105,701 A | * | 8/2000 | Buell | 180/229 |
| 6,988,573 B2 | * | 1/2006 | Tsuruta et al. | 180/68.1 |
| 2002/0038737 A1 | * | 4/2002 | Morishita et al. | 180/291 |
| 2005/0133289 A1 | * | 6/2005 | Nakano et al. | 180/219 |
| 2005/0173918 A1 | * | 8/2005 | Eguchi et al. | 280/834 |

FOREIGN PATENT DOCUMENTS

JP 60261732 A * 12/1985
JP 11013566 A * 1/1999

* cited by examiner

*Primary Examiner*—Lesley D. Morris
*Assistant Examiner*—Daniel Yeagley
(74) *Attorney, Agent, or Firm*—Oblon, Spivak, McClelland, Maier & Neustadt, P.C.

(57) ABSTRACT

A fuel tank generally comprises a tank body, a fuel inlet formed to an upper portion of the tank body, and a cap provided for the fuel inlet. The tank body is provided with a recessed portion recessed in a direction separating from at least one of a vehicle body frame and a vehicle body cover covering the frame so as to form a space therebetween as an air-flow passage. The air-flow passage is composed of, from a vehicle front side, an air introducing section, an air-flow separation section and a separated air-flow section which faces an opening of the intake system of the engine.

19 Claims, 6 Drawing Sheets

FUEL TANK PROVIDED WITH AIR GUIDE STRUCTURE OF STRADDLE-TYPE VEHICLE

BACKGROUND OF THE INVENTION

The present invention relates to a fuel tank of a straddle-type, so-called horse-back-riding-type, vehicle such as buggy car, which is provided with an improved air guide structure.

A straddle-type vehicle generally has a body frame, at its upper portion, covered by a body cover. An engine is disposed at a lower central portion of the body frame, and a fuel tank is arranged above the engine and inside the frame cover at an upper forward portion of the body cover. A straddle-type driver's seat is disposed behind the fuel tank. An air-cleaner is also disposed below the driver's seat on the rear side of the engine.

At a time, when the straddle-type vehicle runs, for example, on a river side road, mud or water is splashed during the running. In such arrangement of the vehicle, therefore, an intake port of the air cleaner is designed so as to be disposed at an upper side inside the body frame, i.e., as below the driver's seat to prevent mud or water splashed during the running from invading into the air cleaner through the intake port.

However, in the arrangement in which the intake port of the air cleaner is positioned below the driver's seat, an intake noise generated at a gap between the fuel tank and the driver's seat will give uncomfortable feeling to a driver. Moreover, because of the arrangement that the outer periphery of the intake port is surrounded by the engine, the body cover, etc., intake resistance against the taken air is increased, and because of high temperature of the taken air, output performance of the engine will be deteriorated.

On the other hand, in the structure of a water-cooled type engine, a radiator is often arranged in front of the engine, and in such arrangement, smooth running flow (air-flow caused by the running of a vehicle) will be blocked by the radiator, which results in an increasing of a temperature of the atmosphere surrounding the engine.

SUMMARY OF THE INVNETION

The present invention was conceived in consideration of the circumstances mentioned above and an object of the present invention is to substantially eliminate the defects or drawbacks encountered in the prior art and to provide a fuel tank provided with an air guide structure of a straddle-type vehicle which has a body frame extending in a longitudinal direction of a vehicle body and a body cover covering the body frame, and in which a fuel tank is disposed inside the body cover, a driver's seat is arranged behind the fuel tank, and an engine having an intake system is disposed below the fuel tank, the fuel tank comprising:
a tank body;
a fuel inlet formed to an upper portion of the tank body; and
a cap provided for the fuel inlet,
the tank body being provided with a recessed portion recessed in a direction separating from at least one of the body frame and the body cover so as to form a space therebetween as an air-flow passage, and said air-flow passage comprising, from a vehicle front side, an air introducing section, an air-flow separation section and a separated air-flow section which faces an opening of the intake system of the engine.

In a preferred embodiment of this aspect, the recessed portion is formed to at least one side portion of a fuel tank bottom portion in the longitudinal direction thereof, the tank body is provided with a protruded portion extending downward from at least one side bottom portion of the tank body facing said recessed portion, and the air-flow passage is divided into the air introduction section disposed upstream side of the downward protruded portion of the tank body, the air-flow separation section disposed near the downward protruded portion and the separated air-flow section disposed downstream side of the downward protruded portion.

The separated air-flow section includes a portion facilitating the separated air-flow which faces the opening of the intake system of the engine and another portion including an air flow containing water content, and the protruded portion of the tank body has a front side wall section facing the air introduction section and a rear side wall section facing the separated air-flow section which has a vertical height higher than that of the air introduction section and the air-flow separation section.

The separated air-flow section is provided with a portion recessed inward in the width direction of the side surface of the tank body. The fuel inlet of the fuel tank may be formed to the upper surface of the fuel tank body in front of the separated air-flow section defined in the recessed portion recessed inward in the width direction of the side surface of the tank body.

The air flowing through the portion of the separated air-flow section facilitating the air-flow is introduced into the intake system of the engine as an engine intake air, and the air flowing through the other portion of the separated air-flow section containing the water content is guided towards the engine.

According to the present invention of the characteristic structure mentioned above, the fuel tank is designed and arranged so as to provide an improved air guide structure, i.e., improved air-flow passage, and therefore, the engine can be effectively cooled and the air intake noise is less transferred to the driver.

In addition, since the air flow containing water content is less guided to the air cleaner, the freedom for arranging the intake pipe can be increased and the number of the intake pipes and the sectional area of the intake passage can be easily increased, thus improving the engine output.

The nature and further characteristic features of the present invention will be made more clear from the following descriptions with reference to the accompanying drawings.

DESCRIPTION OF THE PREFERRED EMBODIMENT

The present invention will be described hereunder with reference to the preferred embodiment shown in the accompanying drawings.

Further, it is to be noted that terms "upper", "lower", "right", "left" and the like are used herein with reference to the illustration of the drawings or in a running (standing) state of a vehicle.

Figure 1:
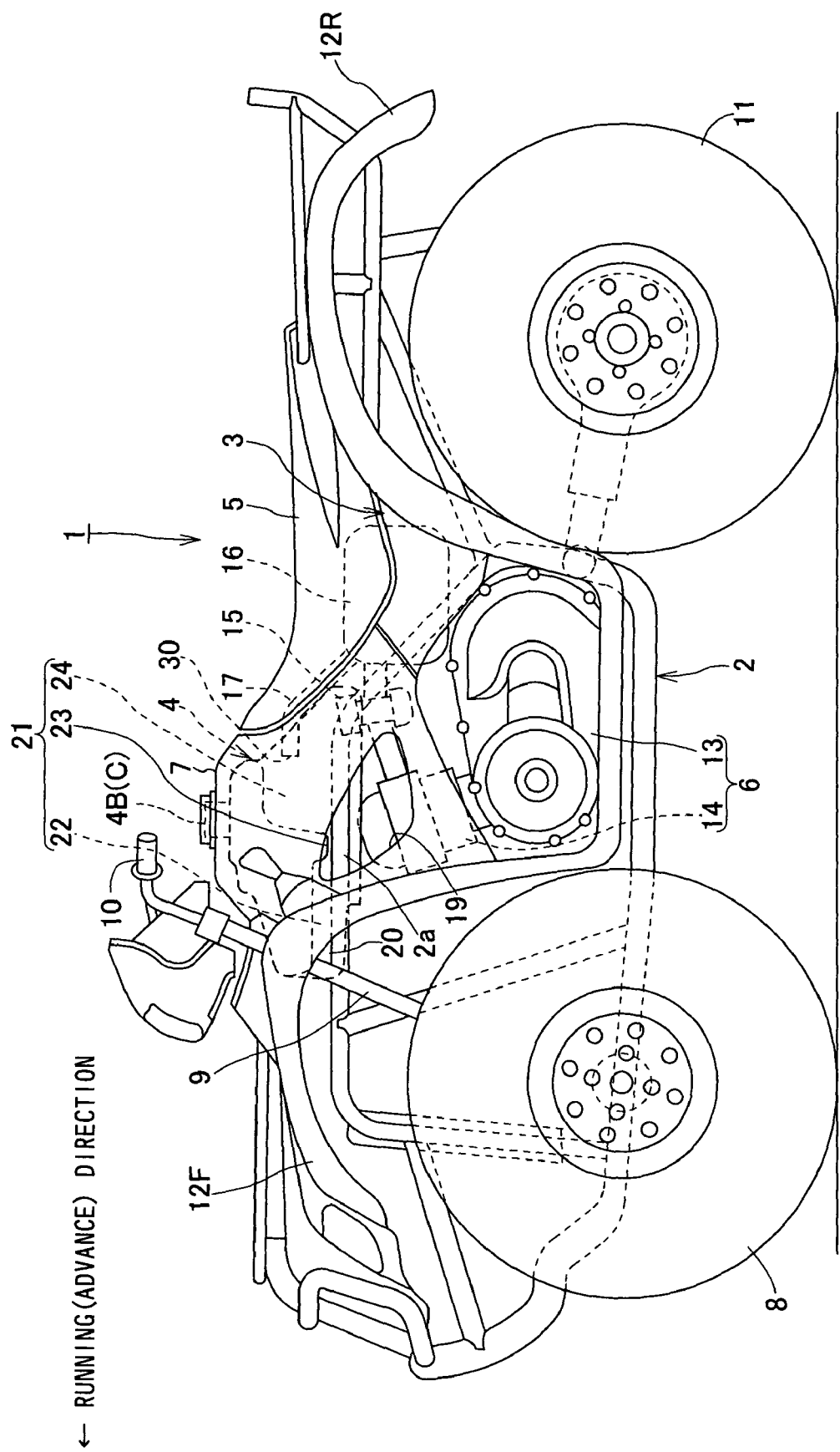
FIG. 1 is a side (left-side) view of a straddle-type vehicle provided with a fuel tank having an improved air-flow structure according to one embodiment of the present invention.

With reference to FIG. 1, a straddle-type, so-called horseback-riding-type, vehicle 1, such as buggy car, has a vehicle body frame 2 extending along a longitudinal direction (running direction) of the vehicle. The upper portion and side portion of the body frame 2 is covered by a body cover 3 formed of a synthetic resin, for example, and arranged integrally with or separately from the body frame 2.

The vehicle 1 is provided with a fuel tank 4 disposed inside the body cover 3 at an upper and front portion therein, and a straddle-type driver's seat 5 is disposed behind the fuel tank 4. An engine 6 is arranged at a central lower portion of the body frame 2 and below the fuel tank 4. The upper surface of the fuel tank 4 is covered by a tank cover 7 made, for example, of metal.

A pair of front wheels 8 provided with low-pressure tires having wide-width are arranged in front of the engine 6 of the frame body 2, and these front wheels 8 are supported to the body frame by a front wheel suspension device, not shown, to be vertically swingable. A steering shaft 9 and a steering handle, both constituting a front wheel steering device, are disposed in front of the fuel tank 4 so that the front wheels 8 are steered bilaterally by the steering handle 10 through the steering shaft 9.

On the other hand, a pair of rear wheels 11 provided with low-pressure tires having wide-width are arranged behind the engine 6 of the frame body 2, and these rear wheels 11 are supported to the body frame 2 by a rear wheel suspension device, not shown, to be vertically swingable.

The front and rear wheels 8 and 11 are covered by fenders. That is, the front wheels 8 are covered by a lateral pair of front fender 12F disposed on the front side of the body cover 3 to be integral or integrally therewith and the rear wheels 11 are also covered by a lateral pair of rear fenders 12R disposed on the rear side of the body cover 3 to be integral or integrally therewith.

The engine 6 mounted to the vehicle body frame 2 is, for example, of four-stroke-cycle single-cylinder engine and is provided with a crankcase 13 and a cylinder assembly 14 disposed in front of an upper surface of the crankcase in a forward inclined manner.

An engine intake system is arranged on a rear side of the cylinder assembly 14, below the fuel tank 4 and the drivers seat 5 and above the crankcase 13. An engine exhaust system, not shown, is also arranged on one side (right side in this embodiment).

The engine intake system includes a carburetor 15 connected to the rear portion of the cylinder head and an air cleaner 16 disposed on the rear side of the carburetor 15 and below the driver's seat 5. An intake pipe 17 extends from the front upper portion of the air cleaner 16 obliquely upward forward.

With reference to FIGS. 2 to 10 of the fuel tank 4, the fuel tank 4 is generally composed of a tank body 4A. A fuel inlet 4B is formed on the upper portion of the tank body 4A and the fuel inlet 4B is closed by a fuel cap 4C.

The fuel tank 4 (i.e., tank body 4A) is formed of a synthetic resin material having a property capable of relatively freely formed so as to provide a desired shape. For example, the fuel tank 4 is manufactured integrally through a blow molding method or rotary forming method. The fuel tank 4 generally has a flat bottom portion and an upper surface portion having an oval-like shape projecting upward in the form of a mount. The longitudinal dimension of the fuel tank 4 is longer than the lateral width and vertical height thereof. The fuel tank 4 is further provided, at its front portion, with a concave portion 18 recessed rearward so as to prevent interfering of the steering shaft 9.

As also shown in FIG. 1, the fuel tank 4 is disposed above and between a lateral pair of main frames 2a constituting the body frame 2. The vehicle body cover 3 has a lower end which is opened to the crankcase 13 of the engine 6, and an opening 19 is formed to the side surface of the body cover 3 positioned between the fuel tank 4 and the engine 6.

Further, a first recessed portion 20 is formed to at least one, preferably both, of side portions of the bottom of the fuel tank 4 along its longitudinal direction. The first recessed portion 20 is recessed inward of the fuel tank 4, and that is, upward and sideways so as to separate from at least one of the body frame 2 and the body cover 3 so as to extend in the longitudinal direction of the vehicle body to thereby create a space 21 between the fuel tank 4, the main frame 2a and the body cover 3 (tank cover 7).

Figure 12:
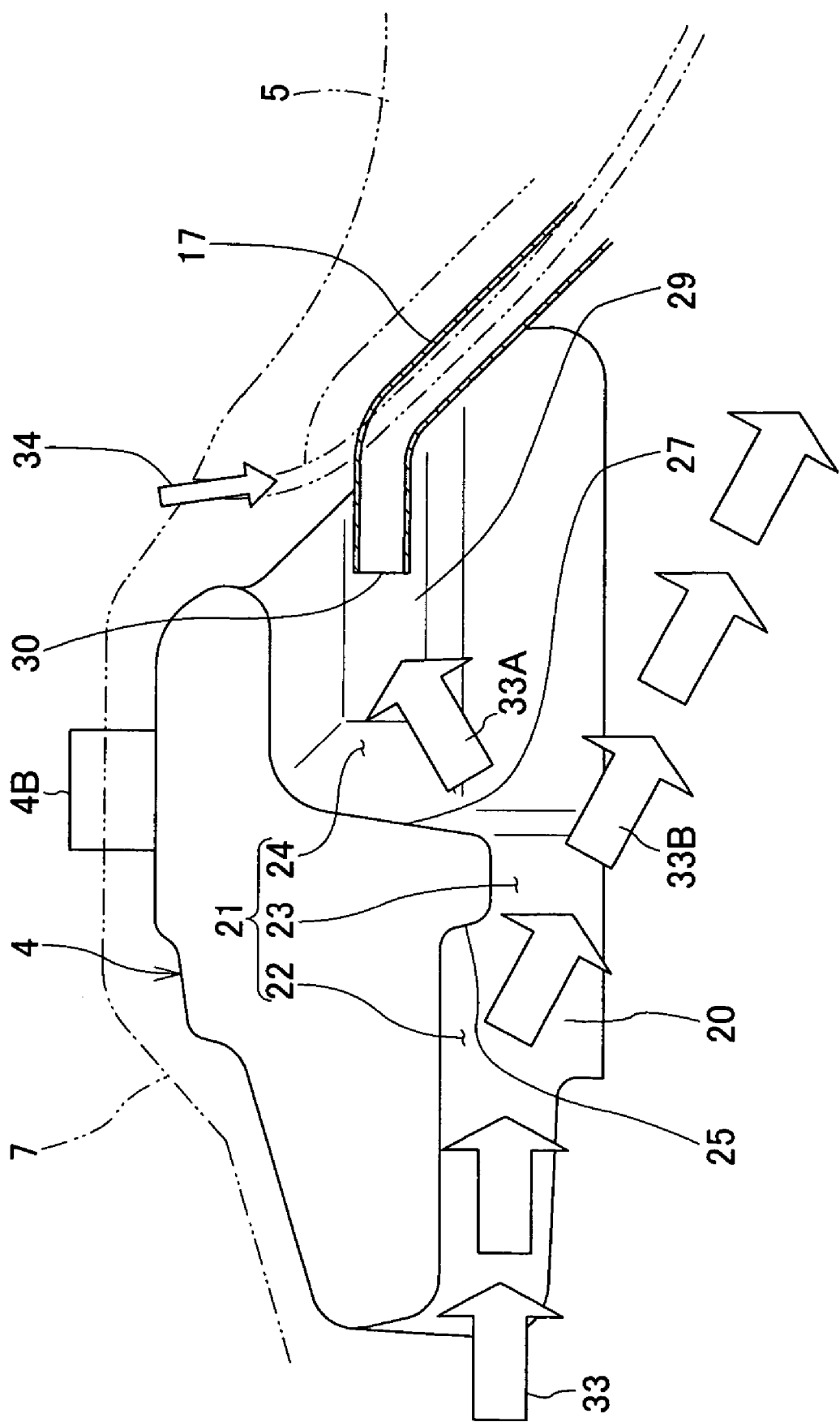
FIG. 12 is a view showing an air-flow pattern caused by running of a vehicle.

This space 21 functions as an air guide passage 21 for air flow, and this air flow guide passage 21 includes, as shown in FIG. 12, an air introducing section 22, an introduced air separation section 23 and a separated air-flow section 24 including a portion facilitating the separated air-flow and the other portion of water content containing air flow. Further, as shown in FIG. 1, the front side portion of the engine 6 is arranged below the intermediate and rear portions of the air-flow guide passage 21, which faces the upper surface of the cylinder assembly 14 with a predetermined distance therefrom.

The fuel tank 4 has a side bottom portion, or side bottom portions, protruded downward at an approximately middle portion of the guide passage 21. That is, as shown in FIG. 12, That protruded portion of the fuel tank 4 has a first downward extending wall section 25 so as to provide a first crank-shaped stepped portion 26 (FIG. 3) in which the rear side of the air-flow guide passage 21 is lower than the front side thereof. Further, the front side, i.e. left side as viewed in FIG. 12, of the air-flow guide passage 21 (upstream side of the first wall section 25) is hence defined as the air introducing section 22 as mentioned before, and a portion of the guide passage 21 near this first downward extending wall section 25 is defined as the air separation section 23.

Figure 3:
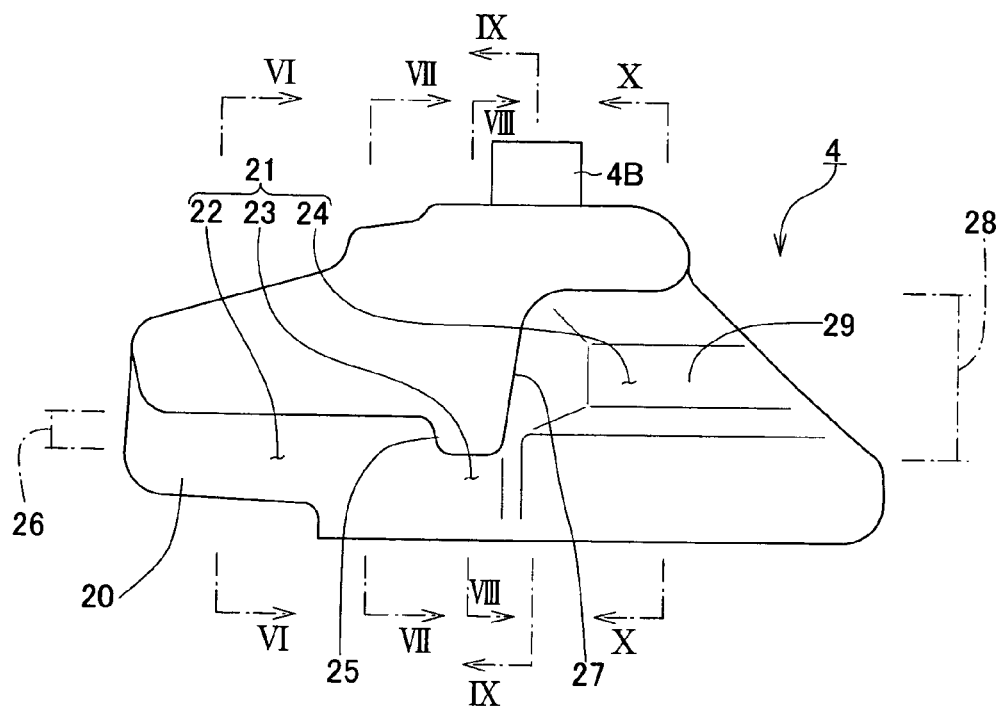
FIG. 3 is a left-side view of the fuel tank.
Figure 4:
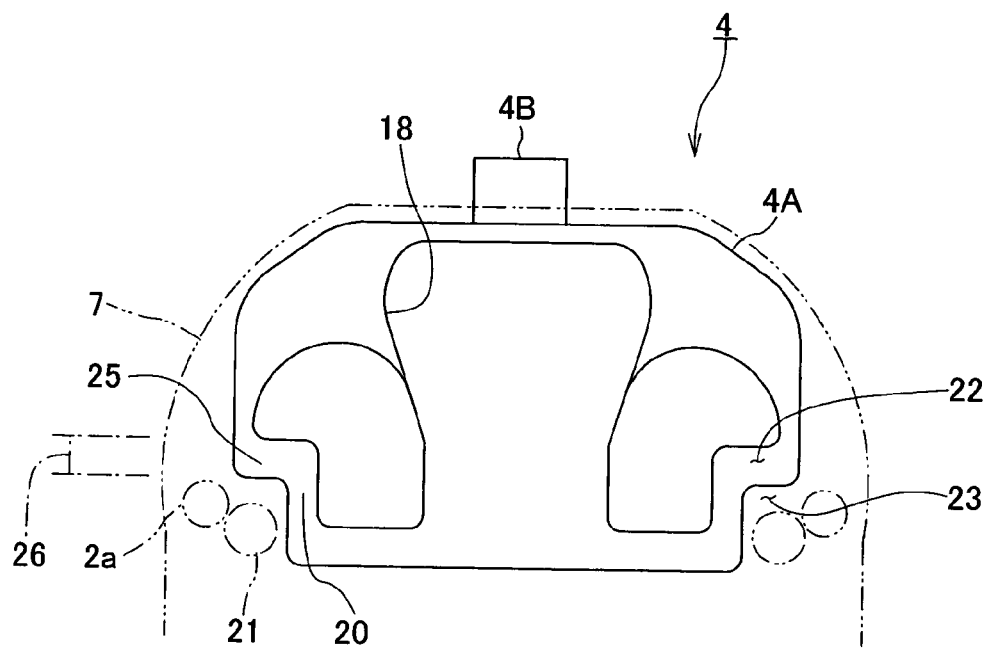
FIG. 4 is a front view of the fuel tank.
Figure 5:
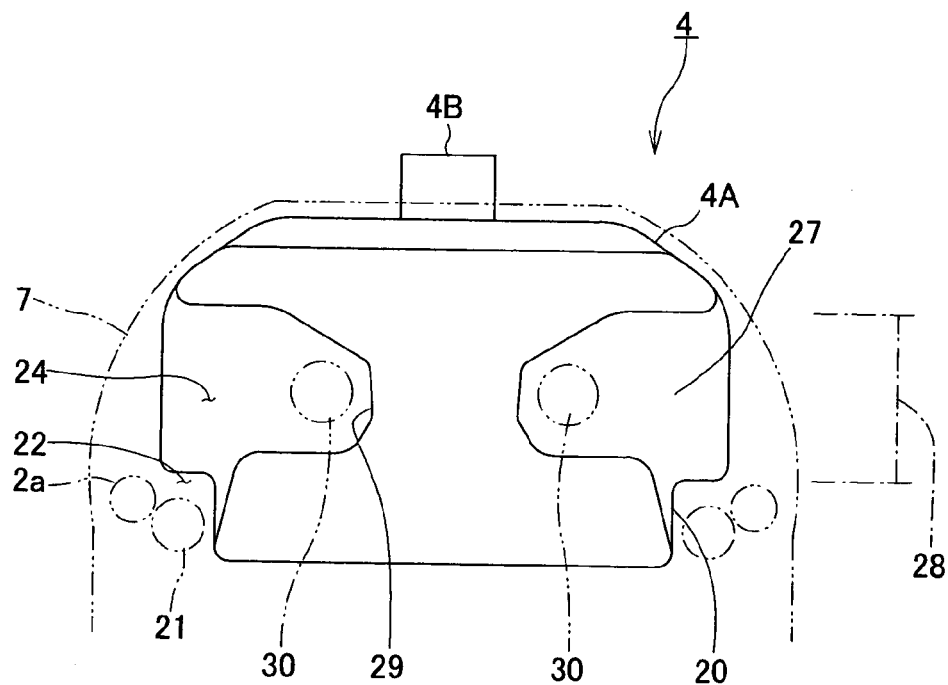
FIG. 5 is a rear-side view of the fuel tank.
Figure 6:
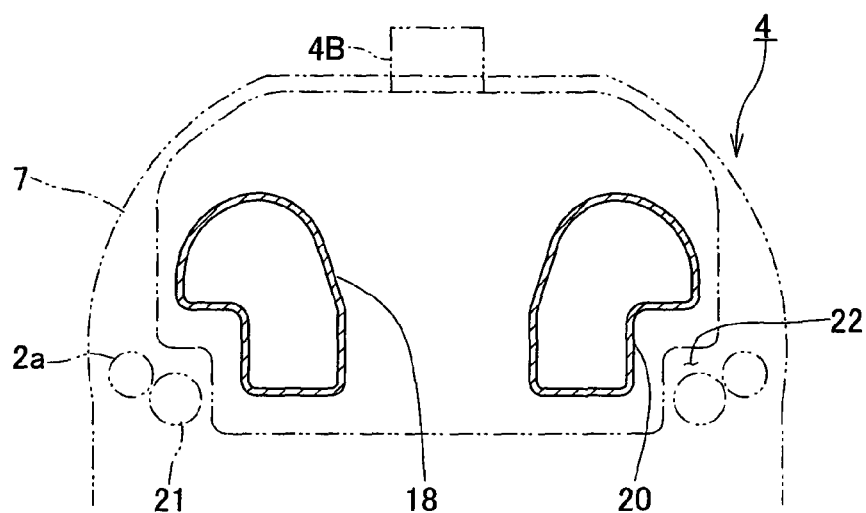
FIG. 6 is a sectional view taken along the line VI-VI in FIG. 3.
Figure 7:
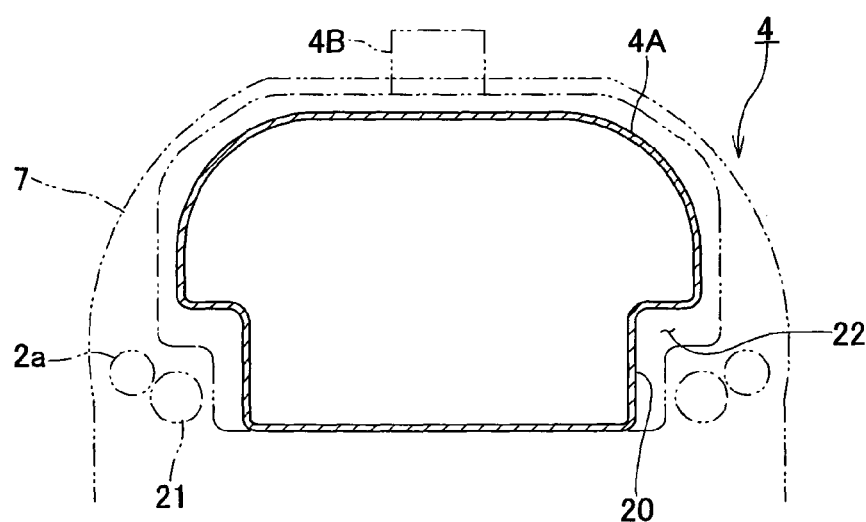
FIG. 7 is a sectional view taken along the line VII-VII in FIG. 3.
Figure 8:
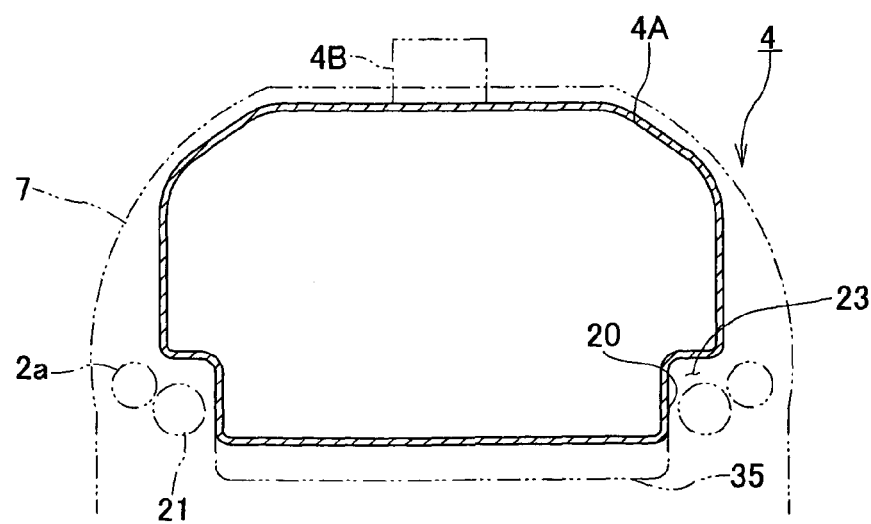
FIG. 8 is a sectional view taken along the line VIII-VIII in FIG. 3.
Figure 9:
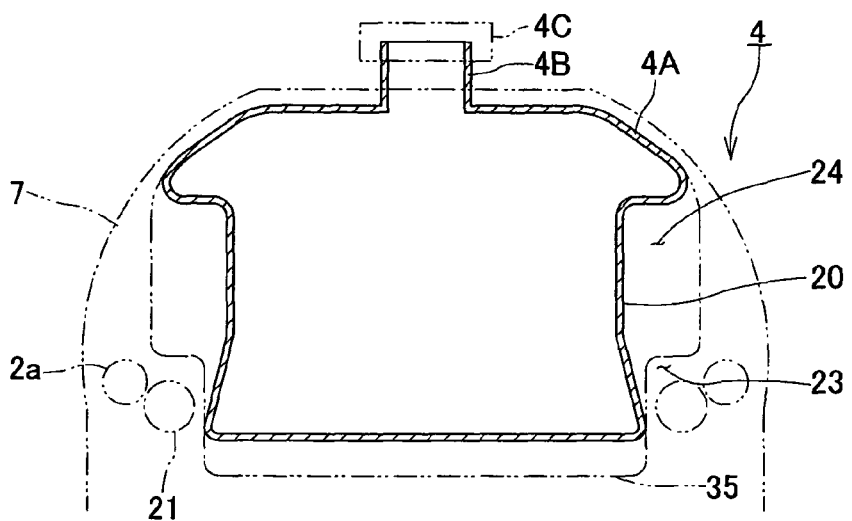
FIG. 9 is a sectional view taken along the line IX-IX in FIG. 3.

The side bottom protruded portion also has a wall section on the rear side thereof formed as a second extending wall section 27 which extends upward from the lower end portion of the protruded portion of the fuel tank 4 to be higher than the first wall section 25 so as to form a second crank-shaped stepped portion 28 (FIG. 3). That is, the rear side wall section 27 has a vertical height higher than that of the front side wall section 25. Further, the rear side, i.e. right side as viewed in FIG. 12, of the air-flow guide passage 21 (downstream side of the second wall section 27) is hence defined as the separated air-flow facilitating section 24 as mentioned before.

Further, in a preferred example, it is desirable to form the fuel inlet 4B to the upper surface of the fuel tank body 4A in front of the separated airflow section 24 defined in the recessed portion recessed inward in the width direction of the side surface of the tank body 4A.

Figure 10:
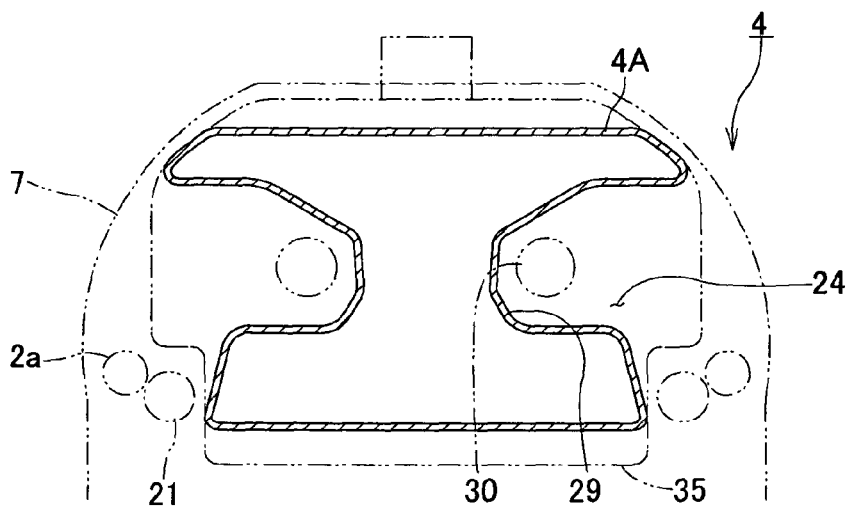
FIG. 10 is a sectional view taken along the line X-X in FIG. 3.

As shown in FIG. 10, in this separated air-flow facilitating section 24, at least one portion of the side surface of the fuel tank 4 is formed as a second recessed portion 29 to be recessed inward in the width direction of the fuel tank 4. An opening 30 of the engine intake pipe 17 extending obliquely upward forward from the front upper portion of the air cleaner 16 faces this recessed portion 29.

Figure 2:
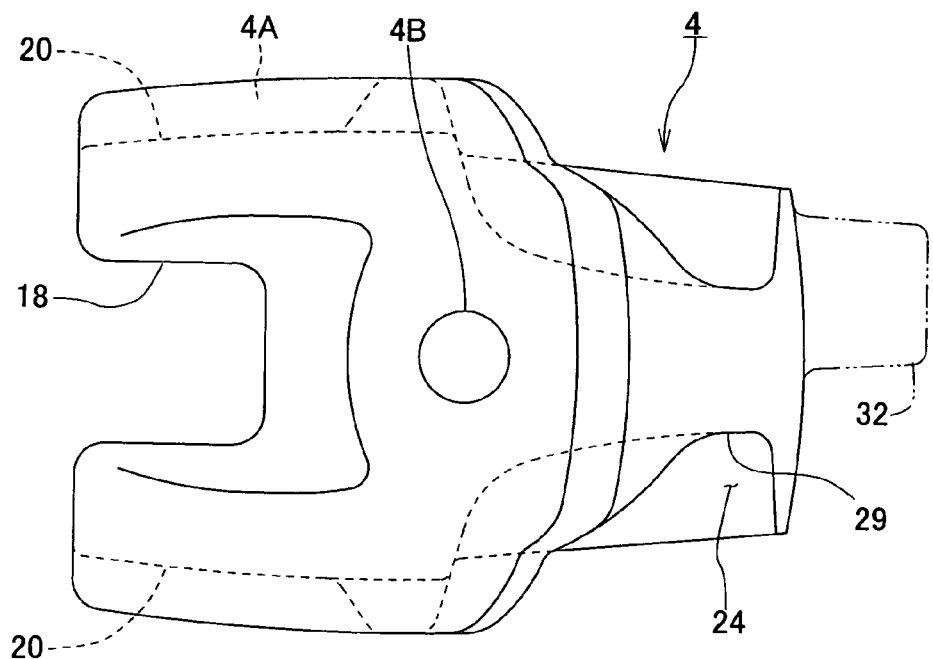
FIG. 2 is a plan view of the fuel tank of the vehicle of FIG. 1.
Figure 11:
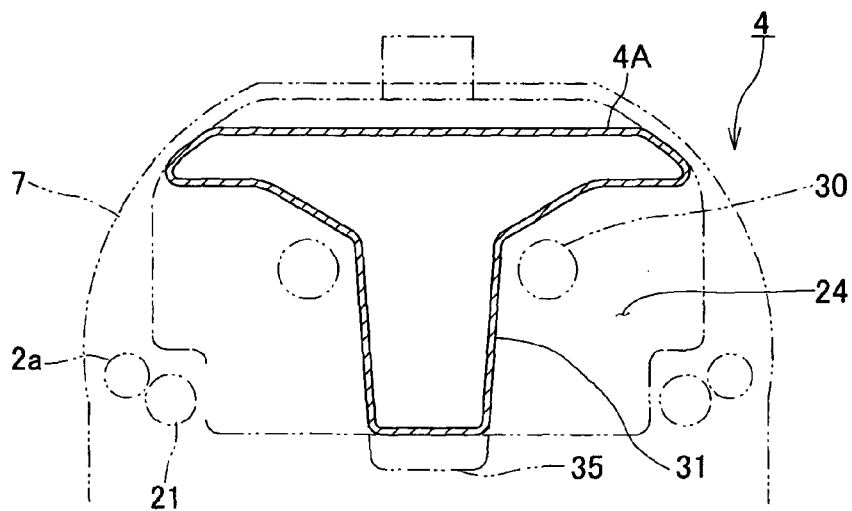
FIG. 11 is a sectional view of a rear-side portion of a fuel tank according to another embodiment of the present invention.

On the other hand, FIG. 11 shows another example of the structure of the separated air-flow facilitating section 24 provided with a flat wall section 31 having no recessed portion 29, and the position in the width direction of the wall section 31 will be determined in consideration of the layout or the balance to the tank capacity. Moreover, it is not necessary for the fuel tank 4 to have laterally symmetric shape and the shape thereof will be changed as occasion demands in consideration of peripheral equipments or members. Furthermore, as shown in FIG. 2 with two-dot chain line, a swelled portion 32 may be formed for ensuring fuel storage space at the rear end portion of the fuel tank 4.

The operation or function of the embodiment of the present invention having the structure mentioned above will be described hereunder.

As mentioned before, FIG. 12 is the view showing the air-flow at the time of running of a vehicle, which is generally shown with large white arrows 33.

When the vehicle runs, an air-flow is caused, and this air-flow 33 enters into the air-flow guide passage 21 formed by the first recessed portion 20 formed to the side portion of the bottom of the fuel tank along the longitudinal direction thereof, the main frame 2a and the body cover 3 (i.e., tank cover 7). The air-flow 33 then flows, inside the body cover 3 towards the rear side, from the front portion of the fuel tank 4 to the rear side thereof in the longitudinal direction of the vehicle body.

More in detail, the air-flow 33 first enters into the guide passage 21 through the flowing-air introducing section 22, and the flowing air collides against the first wall section 25, which extends downward, of the fuel tank 4, at which the flowing air is separated (air-separation section 23). One part (air-flow 33B) of the separated air flow directs obliquely downward towards the upper portion of the engine 6. Further, as mentioned before, the second wall section 27 formed on the rear side of the first wall section 25 of the fuel tank 4 has a height (vertical length) longer than that of the first wall section 25, and accordingly, the other part (air-flow 33A) of the separated air flow is guided to the second recessed portion 29 formed to the air-flow facilitating section 24. The air flow 33A guided into the second recessed portion 29 is then flowed into the air cleaner 16, as engine intake air, through the opening 30 of the intake pipe 17 disposed in the second recessed portion 29.

In FIG. 12, a small arrow 34 indicates another air flow of external atmosphere entering through the gap between the fuel tank 4 and the driver's seat 5.

The separation of the introduced air-flow by the air-flow separation section 23, which is constituted by the first wall section 25 of the fuel tank 4, improves the cooling ability or performance to the engine 6, and in addition, the separated air-flow facilitating section 24 which faces the opening 30 of the intake pipe 17 is covered by the fuel tank 4 and the body cover 3, so that the intake noise is less transferred to the driver.

Moreover, water content contained in the flowing air is separated at the time of colliding with the first wall section 25, and as the water content has a heavy weight in comparison with gas content, the air flow including the water content flows obliquely downward as air-flow 33B towards the upper portion of the engine 6 without being introduced to the air cleaner 16.

The formation of the second recessed portion 29 to the separated air-flow (33A) facilitating section 24, facing the opening 30 of the intake pipe 17, increases the location space and allows the relatively free arrangement of the intake pipe 17, which results in the improvement of the engine output.

Still furthermore, since the flowing air provides a wind pressure, a ram air (ram pressure) effect will be given to fresh air taken from the intake pipe 17, which will also result in the improvement of the engine output.

In addition, the lower end portion of the body cover 3 is opened to the engine 6 and the opening 19 is formed to the side surface of the body cover 3 at the portion between the fuel tank 4 and the engine 6. Accordingly, the wind pressure due to the flowing air in the body cover 3 during the running of the vehicle 1 can be properly reduced (escapes) and, moreover, the heat generated from the engine 6 during the running of the vehicle 1 does not stay inside the body cover 3. Thus, the heat from the engine 6 is less transferred to the fuel tank 4, being advantageous.

Further, it is to be noted that the present invention is not limited to the described embodiment and many other changes and modifications may be made without departing from the scopes of the appended claims.

For example, in the described embodiment, although the crank-shaped first and second stepped portions 26 and 28 are formed to the outer surface of the fuel tank 4, this is not essential and these portions may be formed to be smoothly curved portions. Furthermore, the bottom portion of the fuel tank 4 may be expanded downward as extension 35 as shown with two-dot chain line in FIGS. 8 to 11.

What is claimed is:

1. A fuel tank provided with an air guide structure for a straddle seat vehicle which has a body frame extending in a longitudinal direction of a vehicle body and a body cover covering the body frame, and in which a fuel tank is disposed inside the body cover, a driver's seat is arranged behind the fuel tank, and an engine having an intake system is disposed below the fuel tank, the fuel tank comprising:

a tank body;

a fuel inlet formed to an upper portion of the tank body; and a cap provided for the fuel inlet, wherein the tank body is provided with a recessed portion recessed in a direction separating from at least one of the body frame and the body cover so as to form a space therebetween as an air-flow passage, and the air-flow passage comprising, from a vehicle front side, an air introducing section including a ceiling portion, an air-flow separation section provided with a protruded portion extending downward from the ceiling portion of the air introducing section, and a separated air-flow section which faces an opening of the intake system of the engine, and the separated air-flow section includes a ceiling that has a vertical height higher than that of the air introducing section.

2. The fuel tank provided with an air guide structure according to claim 1, wherein said recessed portion is formed to at least one side portion of a fuel tank bottom portion in the longitudinal direction thereof, and said air-flow passage is divided into the air introducing section disposed on an upstream side of the downward protruded portion of the tank body, the air-flow separation section disposed near the downward protruded portion and the separated air-flow section disposed on a downstream side of the downward protruded portion.

3. The fuel tank provided with an air guide structure according to claim 2, wherein said separated air-flow section includes a portion facilitating separated air-flow which faces the opening of the intake system of the engine and another portion including an air flow containing water content, and said protruded portion of the tank body has a front side wall section facing the air introducing section and a rear side wall section facing the separated air-flow section which has a vertical height higher than that of the air introducing section and the air-flow separation section.

4. The fuel tank provided with an air guide structure according to claim 3, wherein said separated air-flow section is provided with a portion recessed inward in a width direction of a side surface of the tank body.

5. The fuel tank provided with an air guide structure according to claim 4, wherein said fuel inlet of the fuel tank is formed to an upper surface of the fuel tank body in front of the separated air-flow section defined in the recessed portion recessed inward in the width direction of the side surface of the tank body.

6. The fuel tank provided with an air guide structure according to claim 3, wherein the air flowing through the portion facilitating the separated air-flow is introduced into the intake system of the engine as an engine intake air and the air flowing through the other portion of the separated air-flow including water content is guided towards the engine.

7. A straddle seat vehicle, comprising:

a body frame extending in a longitudinal direction of the vehicle;

a body cover covering the body frame;

a fuel tank including a tank body disposed inside the body cover;

a driver's seat arranged partially behind the fuel tank; and an engine having an intake system, the engine being disposed partially below the fuel tank, wherein the tank body includes a recessed portion separated from at least one of the body frame and the body cover so as to form an air-flow passage therebetween, the air-flow passage includes an air introducing section including a ceiling portion, an air-flow separation section including a protruded portion extending downward from the ceiling portion of the air introducing section, and a separated air-flow section which faces an opening of the intake system of the engine, and the opening of the intake system is disposed at a position in front of a gap between a tank cover and the driver's seat.

8. The vehicle according to claim 7, wherein the recessed portion is formed to at least one side portion of a fuel tank bottom portion in the longitudinal direction, and the air-flow passage is divided into the air introducing section disposed on an upstream side of the downward protruded portion of the tank body, the air-flow separation section disposed near the downward protruded portion, and the separated air-flow section disposed on a downstream side of the downward protruded portion.

9. The vehicle according to claim 8, wherein the separated air-flow section includes a portion facilitating separated air-flow which faces the opening of the intake system of the engine and another portion including an air flow containing water content, and the protruded portion of the tank body has a front side wall section facing the air introducing section and a rear side wall section facing the separated air-flow section which has a vertical height higher than that of the air introducing section and the air-flow separation section.

10. The vehicle according to claim 9, wherein the separated air-flow section is provided with a portion recessed inward in a width direction of a side surface of the tank body.

11. The vehicle according to claim 10, wherein the fuel inlet of the fuel tank is formed to an upper surface of the fuel tank body in front of the separated air-flow section defined in the recessed portion recessed inward in the width direction of the side surface of the tank body.

12. The vehicle according to claim 9, wherein the air flowing through the portion facilitating the separated air-flow is introduced into the intake system of the engine as an engine intake air and the air flowing through the other portion of the separated air-flow including water content is guided towards the engine.

13. The vehicle according to claim 7, wherein the separated air-flow section includes a ceiling that has a vertical height higher than that of the air introducing section.

14. A fuel tank, comprising:

a tank body;

a fuel inlet formed to an upper portion of the tank body; and a cap provided for the fuel inlet, wherein the tank body includes a recessed portion forming an air-flow passage, the air-flow passage including an air introducing section including a ceiling portion, an air-flow separation section including a protruded portion extending downward from the ceiling portion of the air introducing section, and a separated air-flow section configured to face an opening of an intake system of an engine, and the separated air-flow section includes a ceiling that has a vertical height higher than that of the air introducing section.

15. The fuel tank provided with an air guide structure according to claim 14, wherein the recessed portion is formed to at least one side portion of a fuel tank bottom portion in a longitudinal direction thereof, and the air-flow passage is divided into the air introducing section disposed on an upstream side of the downward protruded portion of the tank body, the air-flow separation section disposed near the downward protruded portion, and the separated air-flow section disposed on a downstream side of the downward protruded portion.

16. The fuel tank provided with an air guide structure according to claim 15, wherein the separated air-flow section includes a portion facilitating separated air-flow which faces the opening of the intake system of the engine and another portion including an air flow containing water content, and the protruded portion of the tank body has a front side wall section facing the air introducing section and a rear side wall section facing the separated air-flow section which has a vertical height higher than that of the air introducing section and the air-flow separation section.

17. The fuel tank provided with an air guide structure according to claim 16, wherein the separated air-flow section is provided with a portion recessed inward in a width direction of a side surface of the tank body.

18. The fuel tank provided with an air guide structure according to claim 17, wherein the fuel inlet of the fuel tank is formed to an upper surface of the fuel tank body in front of the separated air-flow section defined in the recessed portion recessed inward in the width direction of the side surface of the tank body.

19. The fuel tank provided with an air guide structure according to claim 16, wherein the air flowing through the portion facilitating the separated air-flow is introduced into the intake system of the engine as an engine intake air and the air flowing through the other portion of the separated air-flow including water content is guided towards the engine.

* * * * *